United States Patent [19]
Ledinh et al.

[11] Patent Number: 5,936,676
[45] Date of Patent: Aug. 10, 1999

[54] APPARATUS AND METHOD FOR LINE INTERPOLATING AN INTERLACED VIDEO SIGNAL

[75] Inventors: Chon Tam Ledinh, Brossard; Cong Toai Kieu, St-Laurent; Daniel Poirier, Vaudreuil-Dorion, all of Canada

[73] Assignee: Miranda Technologies Inc., St-Laurent, Canada

[21] Appl. No.: 08/916,960

[22] Filed: Aug. 25, 1997

[51] Int. Cl.⁶ .............................. H04N 7/01; H04N 11/20
[52] U.S. Cl. ............................................ 348/452; 348/451
[58] Field of Search ................................... 348/448, 451, 348/452, 450, 449, 441, 446; H04N 7/01, 11/20

[56] References Cited

U.S. PATENT DOCUMENTS

| | | |
|---|---|---|
| 5,019,903 | 5/1991 | Dougall et al. . |
| 5,249,037 | 9/1993 | Sugiyama et al. ........................ 348/452 |
| 5,347,599 | 9/1994 | Yamashita et al. . |
| 5,355,178 | 10/1994 | Parulski .................................. 348/620 |
| 5,793,435 | 8/1998 | Ward et al. .............................. 348/448 |

FOREIGN PATENT DOCUMENTS

| | | |
|---|---|---|
| 0 266 079 | 5/1988 | European Pat. Off. . |
| 2 184 628 | 6/1987 | United Kingdom . |

OTHER PUBLICATIONS

T. Doyle and M. Looymans, "Progressive Scan Conversion using Edge Information", Signal Processing of HDTV, II, L. Chiariglione (ed.) Elsevier Science Publishers B.V., 1990, pp. 711–721.

Takahiko Fukinuki and Yasuhiro Hirano, "Extended Definition TV Fully Compatible with Existing Standards", IEEE Transactions on Communications, vol. Com–32, No. 8, Aug. 1984, pp. 948–953.

*Primary Examiner*—Michael H. Lee
*Attorney, Agent, or Firm*—Swabey Ogilvy Renault

[57] ABSTRACT

Apparatus and method for producing an output non-interlaced, progressive video component signal from an input interlaced video signal by mixing lines of the interlaced video component signal with lines of a calculated signal. A preferred embodiment adaptively combines three interpolation techniques. They include a steered spatio-temporal interpolation for moving edges, a vertical interpolation for vertically moving horizontal lines and a temporal interpolation for local still picture parts. Robust detectors associated respectively with the above interpolations are also provided. The edge direction detector is composed of subband filters, five oriented differentiators and logical filters for reliable direction decision making. The vertical motion detector for horizontal edges introduced for reducing the horizontal line flicker is composed of temporally directional differentiators working on lowpass filtered signal, a decision device and logical filters. A local moving/still part detector based on the four-field information controls a temporal motion detector to produce the calculated signal.

40 Claims, 9 Drawing Sheets

Notes ○ Current pixel point
       | Considered value

FIG. 4

Horizontal Mask = | | | ① | | |

Notes ○ Current pixel points
       | Considered value

× Considered pixel
• Existing pixel

APPARATUS AND METHOD FOR LINE INTERPOLATING AN INTERLACED VIDEO SIGNAL

BACKGROUND OF THE INVENTION

1. Field of the Invention

The invention relates to real-time image interpolations particularly to apparatus and methods for interpolating between lines of an interlaced video signal to produce a progressive video picture.

2. Description of the Prior Art

The video line doubling for the conversion from an interlaced signal to a progressive one is an interesting subject for upgrading picture quality. The technical literature and the patents related to this subject are abundant. The existing techniques can be divided in the four following classes: Purely Spatial Adaptation (PSA); Vertical Temporal Adaptation (VTA); Fixed Vertical Temporal Filtering (FVTF); and Motion Based Adaptation (MBA).

In the first class namely PSA (see the article by T. Doyle & M. Looymans "Progressive Scan Conversion using Edge Information" in Signal Processing of HDTV, II L. Chiariglione (ed.) Elsevia Science Publishers, BU, 1990 pp 711–721, and U.S. Pat. Nos. 5,019,903 or 5,347,599, the interpolation is purely spatial and is based on some edge orientation detection. The detection, in turn, is based directly on various oriented pixel differences. There are some drawbacks to this technique. The given edge detectors are not very reliable for a noisy or high frequency signal. This phenomenon produces some temporal flickers since the adaptation at a given edge can be different from field to field. Moreover the spatial interpolation yields some resolution loss in the still part of the picture.

In the VTA class (see published GB Pat. Appln. 2,184,628-A), the interpolation results from a purely vertical interpolation or a purely temporal interpolation. The adaptation for these two modes of interpolation is driven by a motion detector. The shortcomings are: the resolution loss for moving parts; the staircase effect on diagonal edges; and the unnatural signal yielded from median like vertical interpolation filters.

The FVTF class was first suggested in the article by T. Fukinuki, Y. Hirano "Extended Definition TV Fully Compatible with Existing Standards", IEEE Trans on Communications, Vol Com-32, No. 8 August 1984 pp 948–953. Fukinuki and Hirano teach the use of a halfband vertical temporal filter for the down conversion from progressive to interlaced format. Conversely, the same filter with appropriate gain can be used for the up conversion (see published EP Pat. Appln. 0,266,079-A2). However, if the interlaced video is not prefiltered, this conversion technique introduces some artifacts in the interpolated video output: staircase effect on moving diagonal edges, vertical resolution loss in the still picture parts, and line flickers of vertically moving horizontal edges.

Finally, the interpolation technique using estimated motion (MBA) offers a promising alternative. However, the MBA is generally costly and the used movement model is not always reliable.

OBJECTS OF THE INVENTION

An object of an aspect of the present invention is to provide an interpolation apparatus and method in which the degradation of diagonal edges, moving or fixed, can be reduced.

Another object of an aspect of the invention is to provide an interpolation apparatus and method in which high resolution in still picture parts is provided.

Yet another object of an aspect of the invention is to provide an interpolation apparatus and method in which the flicker of vertically moving horizontal edges is reduced.

SUMMARY OF THE INVENTION

According to the above objects, from a broad aspect, there is provided an apparatus for producing an output non-interlaced, progressive video component signal from an input interlaced video signal composed of a luminance signal and at least one chrominance signal by mixing lines of the interlaced video component signal with lines of a calculated signal. The apparatus comprises interpolator means for producing an interpolated component signal using information from at least one field of the interlaced video component signal. The apparatus further comprises temporal motion detector means for producing a temporal motion indicative signal using information from at least two fields of the interlaced video signal, and temporal motion adapter means for generating the calculated signal using the first interpolated component signal and the temporal motion indicative signal. The apparatus further comprises line multiplexer means for combining the interlaced video component signal with the calculated signal to produce the output progressive video component signal.

According to another broad aspect of the present invention, there is provided an apparatus for producing an output non-interlaced, progressive video luminance signal by mixing lines of an input interlaced video luminance signal with lines of a calculated signal. The apparatus comprises edge direction detector means for producing a spatial direction indicative signal for each pixel of the calculated signal to be interpolated using luminance information from at least one field of the interlaced video signal. The apparatus further comprises interpolator means for producing an interpolated luminance signal using spatio-temporal information from at least two fields of the interlaced video luminance signal with the spatial direction indicative signal. The apparatus further comprises motion detector means for producing a temporal motion indicative signal using luminance information from at least two fields of the interlaced video luminance signal and temporal motion adapter means for generating the calculated signal using the interpolated signal and the temporal motion indicative signal. The apparatus further comprises line multiplexer means for combining the interlaced video luminance signal with the calculated signal to produce the output progressive video luminance signal.

According to still another broad aspect of the present invention, there is provided a method for producing an output non-interlaced, progressive video component signal from an input interlaced video signal composed of a luminance signal and at least one chrominance signal by mixing lines of the interlaced video component signal with lines of a calculated signal. The method comprising steps of: a) producing an interpolated component signal using information from at least one field of the interlaced video component signal; b) producing a temporal motion indicative signal using information from at least two fields of the interlaced video signal; c) generating the calculated signal using the interpolated component signal and the temporal motion indicative signal; and d) combining the interlaced video component signal with the calculated signal to produce the output progressive video component signal.

BRIEF DESCRIPTION OF THE DRAWINGS

The invention will be better understood by way of the following detailed description of preferred embodiments with reference to the appended drawings, in which.

DETAILED DESCRIPTION OF THE PREFERRED EMBODIMENTS

Figure 1:
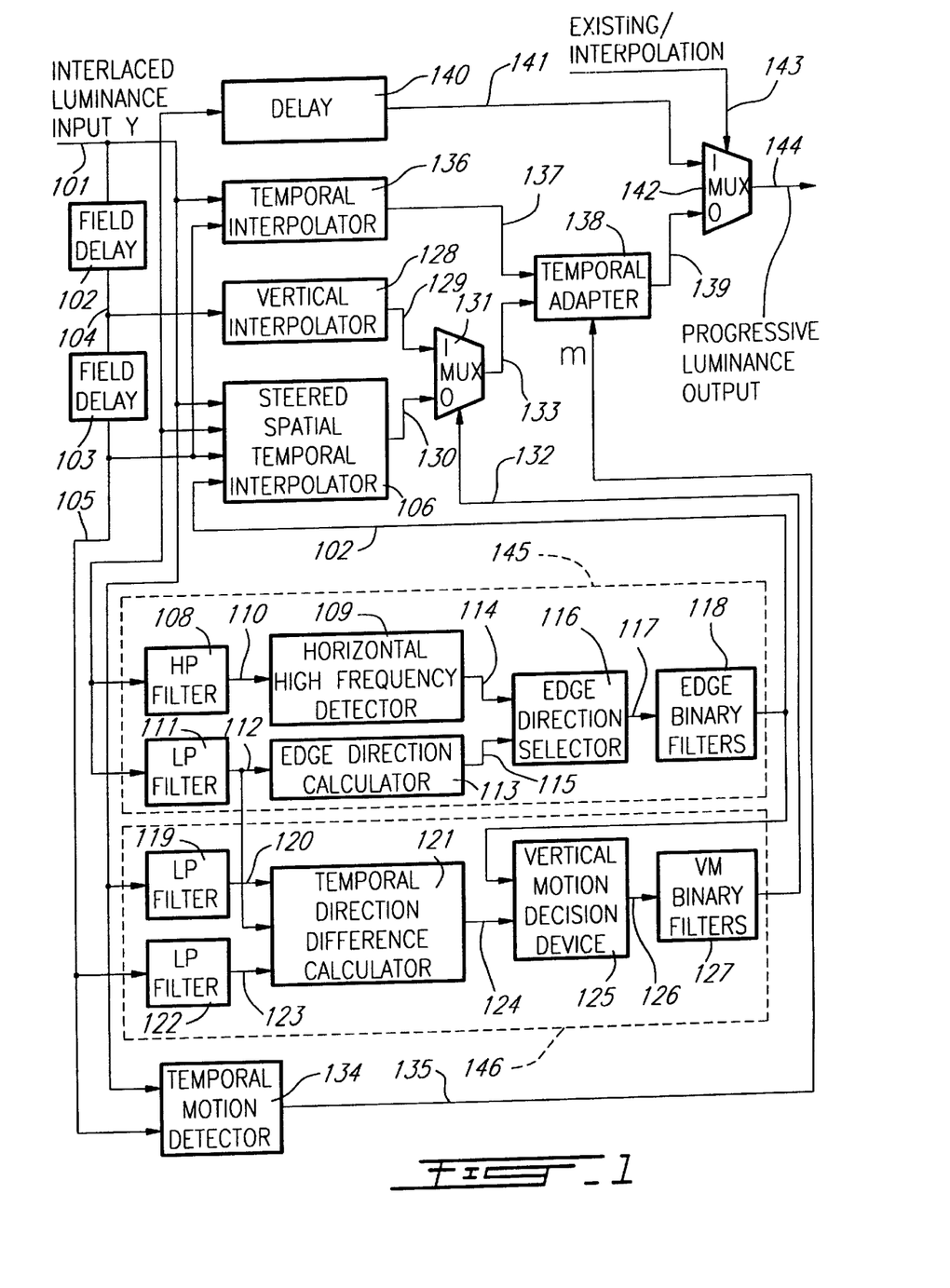
FIG. 1 is a general functional block diagram illustrating a first preferred embodiment of an apparatus and method according to the present invention used for line interpolation of a luminance signal.

Referring now to the drawings, the proposed general block diagram for line interpolating a luminance signal as part of a digital video signal is illustrated in FIG. 1. It is to be understood that the digital video signal to be interpolated was previously obtained from an analog video signal through conventional analog to digital converter means as well known in the art. The luminance input signal 101 is applied to two field delays in series 102, 103. In the example shown, the field delay output 105, 104 and the signal input 101 represent the three video consecutive fields, which are respectively the past or previous field, the present field and the future or next field. This terminology is utilized in relation to the pixel to be interpolated under consideration, as will be later explained in more detail with reference to FIG. 8. Although the field containing the current pixel to be interpolated and adjacent previous and next fields are preferably used, it is to be understood that other two temporally proximate fields can be used to provide line interpolation according to the present invention, using proper field delay means. The next and the previous signals 101 and 105 are sent to a temporal interpolator 136. The present signal 104 is applied to a vertical interpolator 128. The three signals 101, 104, 105 are sent together to a steered spatio-temporal interpolator 106 which also receives an edge spatial direction indicative signal 107 given, in turn, by an edge direction detector 145.

Figure 8:
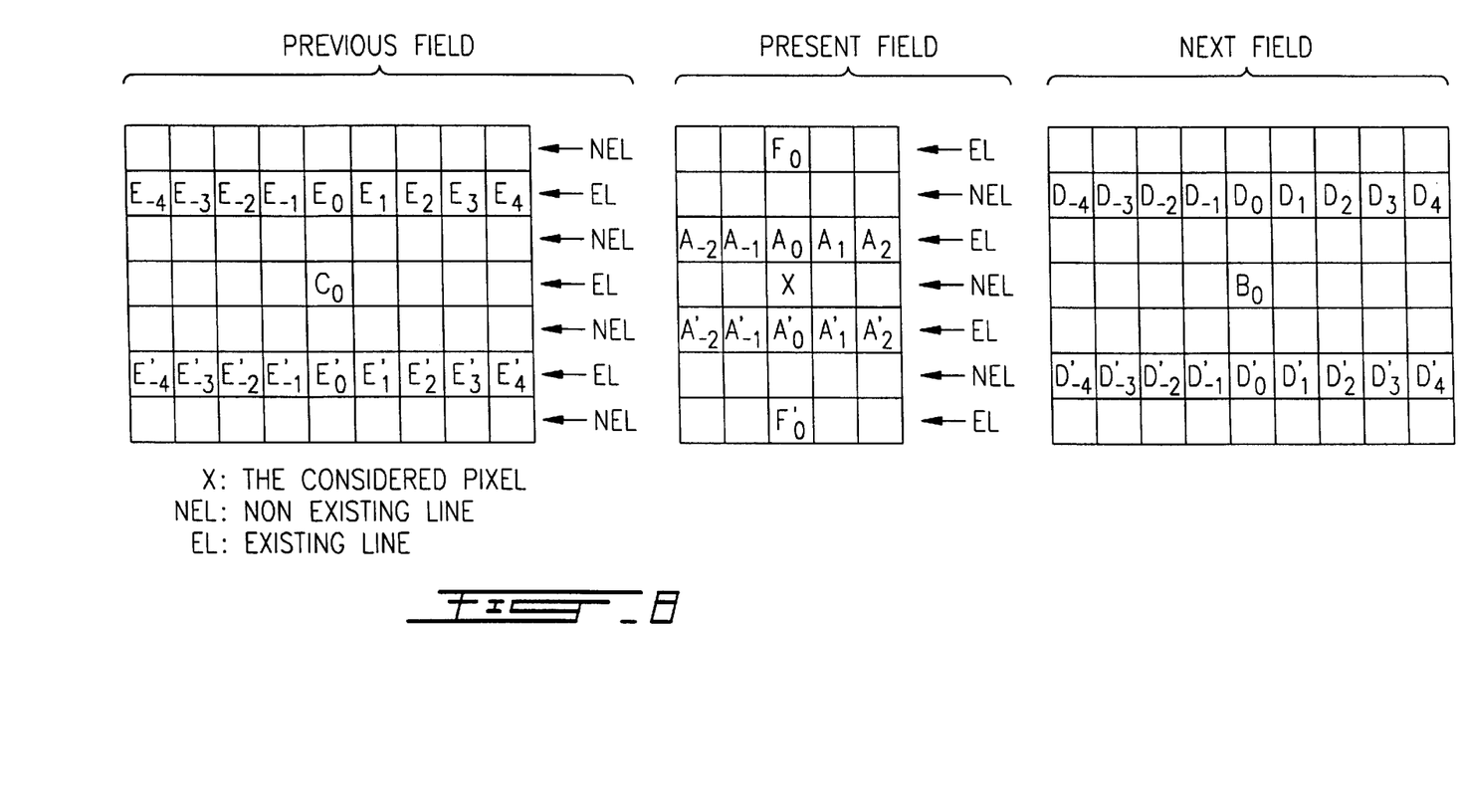
FIG. 8 illustrates various pixel positions used by the temporal, vertical, and steered spatial and temporal interpolators, for the past, present and next fields.
Figure 10:
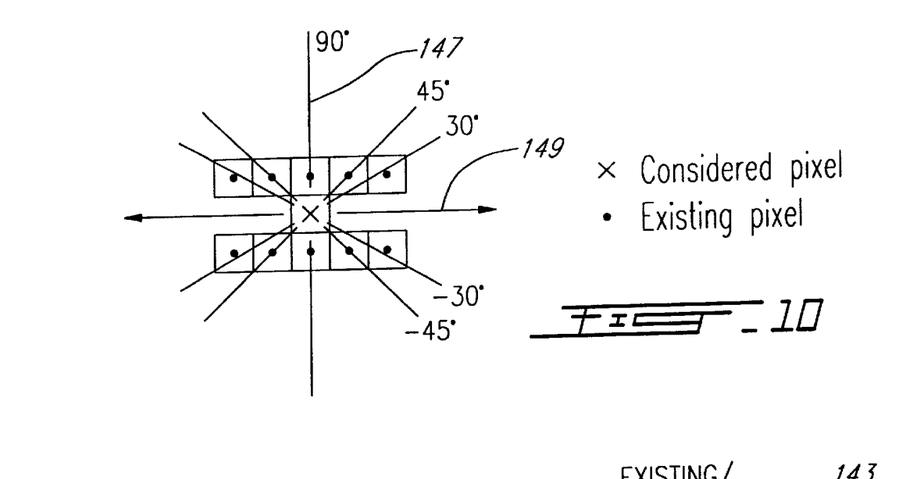
FIG. 10 is a representation of five proposed spatial edge directions.

Referring now to FIG. 8 illustrating various positions of the pixels used for interpolation, the above mentioned interpolators will be now explained, in view of the five predetermined spatial edge directions shown in FIG. 10, respectively forming angles of about ±30°, ±45° and +90° in a floating reference system generally designated at 147 having its origin being located at a pixel to be interpolated and having a first axis horizontally oriented. For the temporal interpolator 136, the output TF designated at 137 is given by:

$$TF = (B_0 + C_0)/2 \qquad (1)$$

wherein:

TF is the temporally interpolated luminance signal value;

$B_0$ is a next field pixel value spatially corresponding to a pixel to be interpolated; and $C_0$ is a previous field pixel value spatially corresponding to the pixel to be interpolated.

For the vertical interpolator 128, the output VF designated at 129 is given by:

$$VF = (5A_0 + 5A'_0 - F_0 - F'_0)/8 \qquad (2)$$

wherein:

VF is the vertically interpolated luminance signal value;

$A_0$ and $A'_0$ are values of adjacent pixels of respectively preceding and following existing lines in the direction +90° to a pixel to be interpolated;

$F_0$ and $F'_0$ are values of existing pixels adjacent pixels $A_0$ and $A'_0$ in the direction +90°.

The output SST designated at 130 of the steered spatio-temporal interpolator is selected from the five following equations:

$$SST\text{-}30° = (4A_{-2} + 4A'_{2} + 2B_0 + 2C_0 - E_{-4} - E'_{4} - D_{-4} - D'_{4})/8 \qquad (3)$$

$$SST\text{+}30° = (4A_{2} + 4A'_{-2} + 2B_0 + 2C_0 - E_{4} - E'_{-4} - D_{4} - D'_{-4})/8 \qquad (4)$$

$$SST\text{-}45° = (4A_{-1} + 4A'_{1} + 2B_0 + 2C_0 - E_{-2} - E'_{2} - D_{-2} - D'_{2})/8 \qquad (5)$$

$$SST\text{+}45° = (4A_{1} + 4A'_{-1} + 2B_0 + 2C_0 - E_{2} - E'_{-2} - D_{2} - D'_{-2})/8 \qquad (6)$$

$$SST\text{+}90° = (7A_0 + 7A'_0 + F_0 + F'_0 + 4B_0 + 4C_0 - 2E_0 - 2E'_0 - 2D_0 - 2D'_0)/16 \qquad (7)$$

wherein:

SST is the first interpolated luminance signal associated with each of said directions;

$A_{\pm i}$ is a value of a pixel±i, in said reference system having its origin being located at the pixel to be interpolated, of a present field existing previous line adjacent a present field line containing the pixel to be interpolated;

$A'_{\pm i}$ is a value of a pixel±i, in the reference system, of a present field existing next line adjacent the present field line;

$B_0$ is a next field pixel value spatially corresponding to the pixel to be interpolated;

$C_0$ is a previous field pixel value spatially corresponding to the pixel to be interpolated;

$D_{\pm i}$ is a value of a pixel±i, in the reference system having its origin being located at a next field pixel spatially corresponding to the pixel to be interpolated, of a next field existing previous line adjacent a next field line containing the next field pixel;

$D'_{\pm i}$ is a value of a pixel±i, in the reference system having its origin being located at the next field pixel, of a next field existing next line adjacent the next field line;

$E_{\pm i}$ is a value of a pixel±i, in the reference system having its origin being located at a previous field pixel spatially corresponding to the pixel to be interpolated, of a previous field existing previous line adjacent a previous field line containing the previous field pixel;

$E'_{\pm i}$ is a value of a pixel±i, in the reference system having its origin being located at the previous field, of a previous field existing next line adjacent the previous field line;

$F_0$ is a value of a present field existing pixel adjacent a pixel corresponding to $A_0$ in the direction +90°; and $F'_0$ is a value of a present field existing pixel adjacent a pixel corresponding to $A'_0$ in the direction +90°.

Equation (1) is chosen in order to reduce additive noise by 3 dB. Equation (2) defines a simple four tap halfband filter. Other filters, such as:

$$(36A_0+36A'_0-4F_0-4F'_0)/64$$

or $$(37A_0+37A'_0-5F_0-5F'_0)/64$$

are also possible candidates to obtain signal VF at 129. The four first steered spatio-temporal filters described by equations (3), (4), (5), (6) are spatially directed versions of the following vertical temporal halfband filter:

$$VT=(4A_0+4A'_0+2B_0+2C_0-D_0-D'_0-E_0-E'_0)/8 \qquad (8)$$

Applicant has found that these spatio-temporal filters give more pleasant results than those provided from purely spatial filters.

The SST+90, as given by equation (7), is also a vertical temporal filter output similar to the output of equation (8). However the vertical bandwidth of SST+90, as given by equation (7), is larger than that given by equation (8) when temporal frequency is nearly zero. This feature has been selected since the human visual system is more sensitive to still part of the picture. Moreover, a more complex filter than that defined by equation (7), i.e. with more lines, does not necessarily give a noticeable difference.

Figure 6:
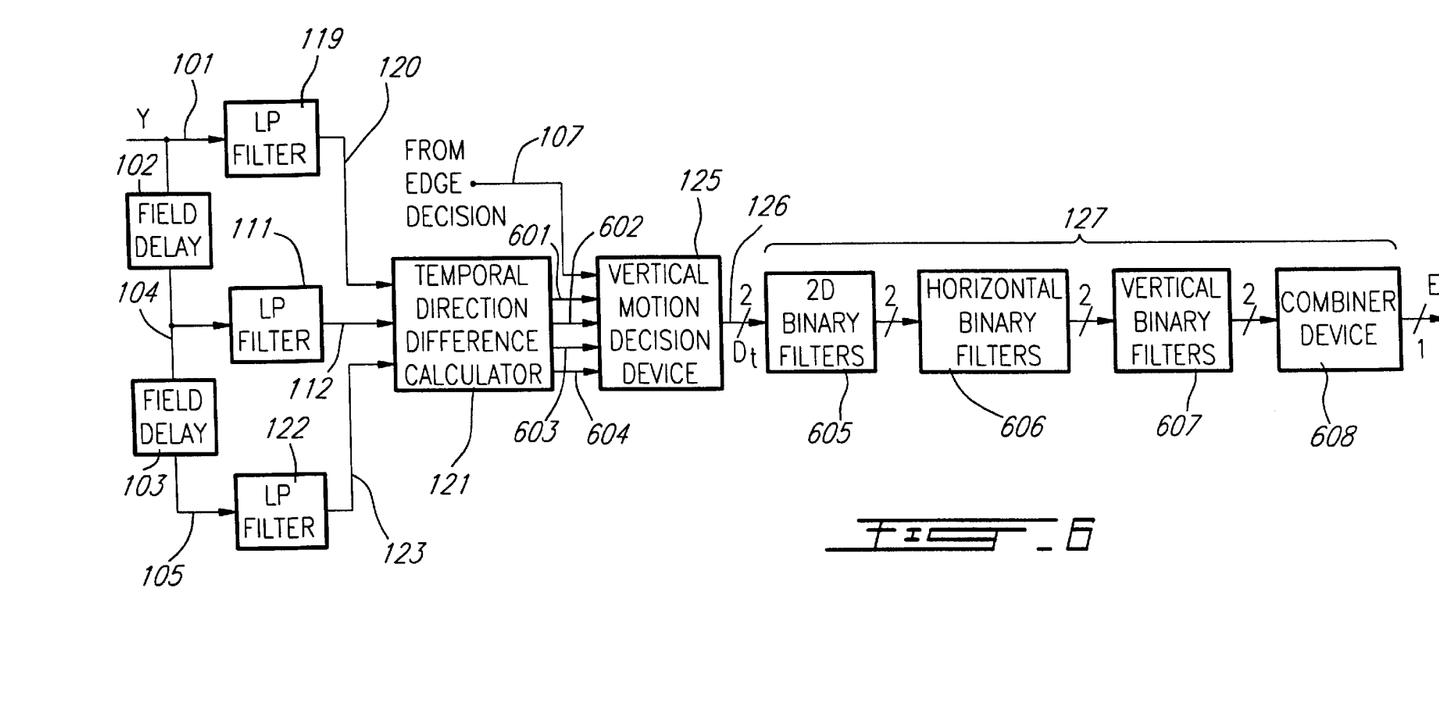
FIG. 6 is a block diagram of a proposed vertical motion detector for the embodiment shown in FIG. 1.

Referring again to FIG. 1, the two outputs 129 and 130 of the vertical and the steered spatio-temporal interpolators respectively are sent together to a selector such as multiplexer 131 which is also driven by a binary signal 132 provided from a vertical motion detector generally designated at 146. The vertical motion detector 146, which will be described later in more detail with reference to FIG. 6, is designed to detect vertically moving horizontal lines. In the case of vertically moving horizontal lines, the vertical motion signal at 132 is "on" and the multiplexer 131 selects the vertical interpolator output 129. Otherwise the steered spatial and temporal interpolator output 130 is selected by the multiplexer 131.

Figure 9:
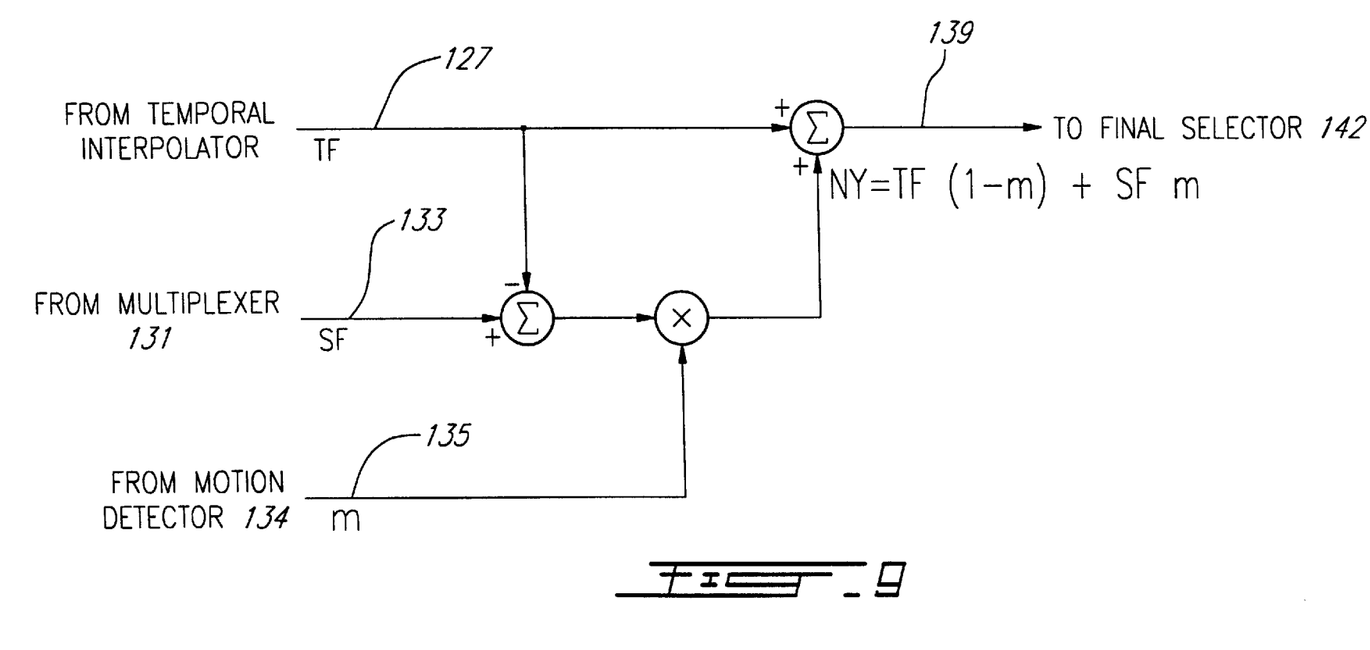
FIG. 9 is a block diagram of proposed temporal motion adapter implementations for the embodiments shown in FIGS. 1 and 2.

The selector output SF, which is a first interpolated luminance signal as designated at numeral 133, and the temporally interpolated signal TF, which is a second interpolated luminance signal designated at 137, are both sent to a temporal motion or moving/still adapter 138. The adaptation is controlled by a temporal motion indicative signal m, as designated at 135, provided by a temporal motion or moving/sill detector 134. The calculated output signal NY, as designated at numeral 139, which is an interpolated luminance signal, is described by the following equation:

$$NY=TF(1-m)+SFm$$

or $$NY=TF+m(SF-TF) \qquad (9)$$

wherein:

NY is the calculated signal value;

SF is the first interpolated luminance signal value;

TF is the second interpolated luminance signal value; and m is the temporal motion indicative signal value, with $0 \le m \le 1$ FIG. 9 illustrates two possible implementations of equation (9). In other words, when m, the detected motion value, is high and equal to 1, the calculated signal NY at 139 is equal to signal SF. When m=0, signal NY at 139 is equal to signal TF. Otherwise, signal NY at 139 is a linear combination of the temporal interpolation resulting signal TF and the spatial interpolation resulting signal SF.

The newly calculated signal NY at 139 is then fed to a multiplexer 142 with the existing luminance line 141 provided from an appropriate delay 140 fed in turn by the present luminance signal 104, to finally form a progressive luminance output signal 144 as shown in FIG. 1. An existing luminance interpolation signal can also be incorporated in the progressive luminance signal by multiplexer 142.

Associated with the three interpolation techniques as presented before, are the edge direction detector 145, the vertical motion detector 146 and the temporal motion or four-field moving/still detector 134.

The purpose of the edge direction detector 145 is to provide for each pixel under consideration a spatial orientation of the interpolation filter. Applicant has found that the five discrete directions as illustrated in FIG. 10 are sufficient for a majority of pictures. The floating reference system generally designated at 147 in FIG. 10 has its origin located at a presently considered pixel X to be interpolated and has a first axis 149 horizontally oriented, to which the five selected directions angles refer. Although, it is to be understood that a larger number n of discrete directions can be used to obtain still better results.

When the number n of directions is fixed, the direction of the highest correlation corresponds generally to the smallest absolute value of pixel differences. That is, for the five given directions:

$$dir\ i^*=arg\ \min_i\{|A_i-A'_i|,\ i=-1,-2,0,1,2\} \qquad (10)$$

wherein the pixels Ai are defined as shown in FIG. 8. The detection based on equation (10) is generally good for a region of low resolution, noise free and alias free. In the presence of these defaults, i.e., in a high frequency region or in the presence of noise, the direct calculation of equation (10) leads to inconsistent results between consecutive pixels to be interpolated. Inconsistent results yield activity artifact in a still picture or flicker in a dynamic sequence.

In order to prevent the difficulty in the direction detection, the incoming present luminance signal 104 shown in FIG. 1 is divided in two subbands through a highpass filter 108 and a lowpass filter 111. The outputs 110, 112 of these filters are applied respectively to a horizontal high frequency detector 109 and to an edge direction calculator 113. The outputs 114, 115 of these two devices are sent to an edge direction selector 116 sending its output 117 to edge binary filters 118. The final filtered spatial direction indicative signal 107 is utilized by the steered interpolator 106 in order to select one of the five interpolations described by equations (3),(4),(5), (6) and (7).

Figure 3:
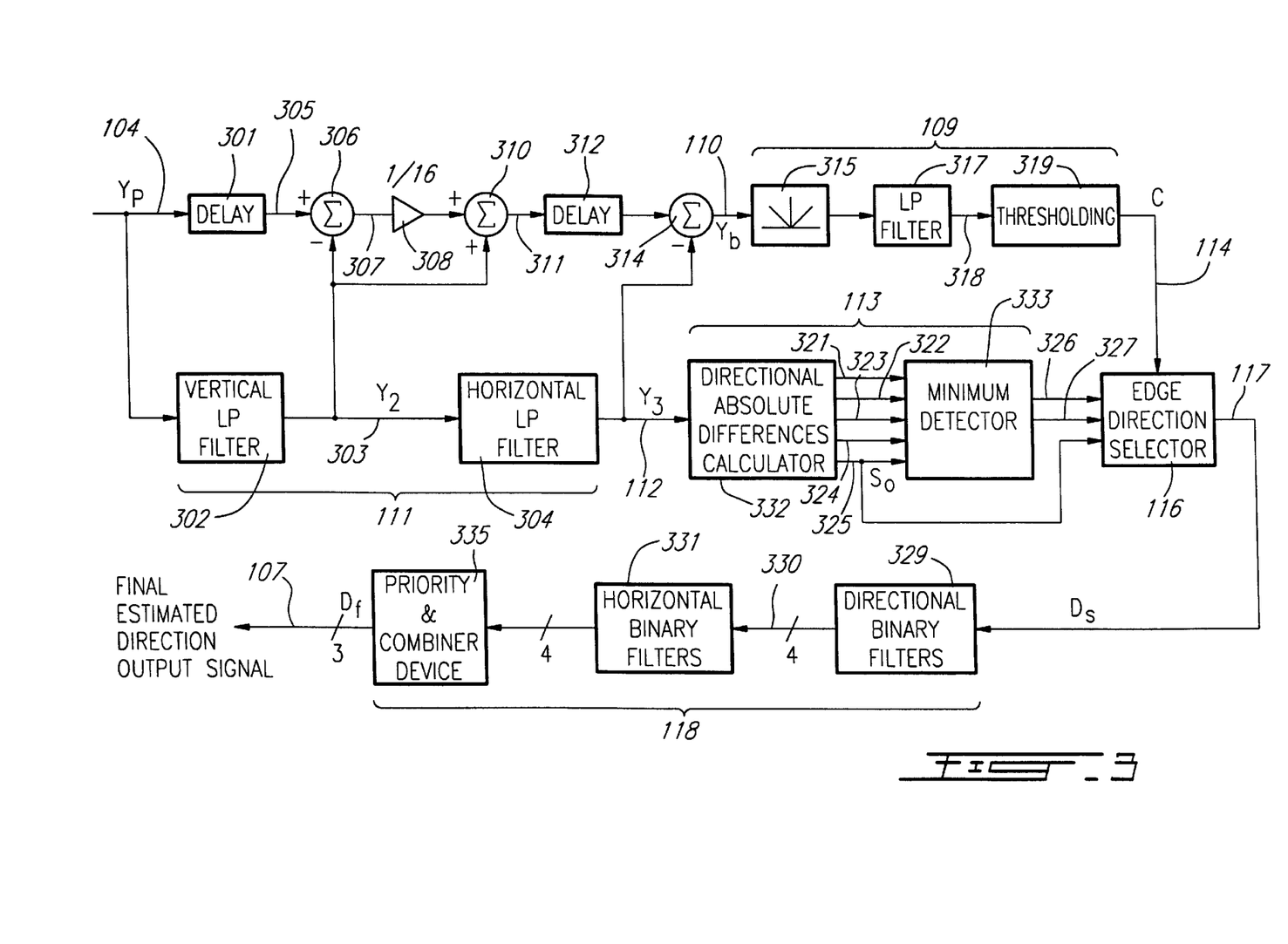
FIG. 3 is a block diagram of a proposed edge direction detector for the embodiment shown in FIG. 1.

The details of the edge direction detector 145 is illustrated in FIG. 3. The lowpass filter 111 in FIG. 1 is composed of two separable filters 302 and 304 in series.

The filter 302 is a vertical lowpass halfband filter whose impulse response is:

$$(-8, 0, 40, 64, 40, 0, -8)/128 \qquad (11)$$

the filter output $Y_2$ being designated at 303.

The filter 304 is a horizontal lowpass filter whose impulse response is:

$$(-4, -2, 8, 18, 24, 18, 8, -2, -4)/64 \qquad (12)$$

the filter output $Y_3$ being designated at 112.

The normalized bandwidth of the filter 304 is smaller than that of the filter 302. This fact is due essentially to the non squared pixel of video signal sampled at 13.5 MHz.

The highpass filter 108 shown in FIG. 1 is essentially a horizontal high pass filter which is synthesized from the incoming present luminance signal $Y_p$ at 104, the output $Y_2$ at 303 and the $Y_3$ at 112 of the previously mentioned lowpass filter, as shown in FIG. 3. The highpass filter output $Y_h$ at 110 is equal to:

$$Y_h = (Y_2 - Y_3) + 1/16(Y_p - Y_2) \qquad (13)$$

using delay 301, first adder 306, attenuator 308, second adder 310, second delay 312 and third adder 314, connected as shown in FIG. 3.

In order to detect the high frequency or noisy region the signal $Y_h$ at 110 is sent to three following devices in series. There are, in order, an absolute detector 315, a lowpass horizontal filter 317, and a thresholding device 319.

The impulse response of the lowpass filter 317 is:

$$(1, 2, 1)/4 \qquad (14)$$

Applicant has found that a threshold set to 8 in the device 319 is suitable. That means the detector output C at 114, is "on" for signaling a high frequency region, if its input 318 is at least equal to 8; otherwise it will be "off".

The lowpass final output $Y_3$ at 112 is used by a calculator 332 to derive five directional absolute differences 321, 322, 323, 324 and 325. They are the following:

$$S_0 = |Y_3(A_0) - Y_3(A'_0)| \text{ for direction } 90° \qquad (15)$$

$$S_1 = |Y_3(A_1) - Y_3(A'_{-1})| \text{ for direction } 45° \qquad (16)$$

$$S_2 = |Y_3(A_2) - Y_3(A'_{-2})| \text{ for direction } 30° \qquad (17)$$

$$S_3 = |Y_3(A_{-1}) - Y_3(A'_1)| \text{ for direction } -45° \qquad (18)$$

$$S_{46} = |Y_3(A_{-2}) - Y_3(A'_2)| \text{ for direction } -30° \qquad (19)$$

wherein $Y_3(A_i)$ and $Y_3(A'_i)$ denote the filtered luminance values at the positions $A_i$ and $A'_i$ respectively, as showing in FIG. 8.

The five above absolute values are applied in turn to a minimum detector 333 which gives two outputs 326 and 327. The first output 326 is the minimum value $S_m$:

$$S_m = \min(S_i; i=0, \ldots 4) \qquad (20)$$

and the second output 327 is the corresponding direction $D_m$.

$$D_m = \begin{array}{ll} 90° & \text{if } S_m = S_0 \\ 45° & \text{if } S_m = S_1 \\ 30° & \text{if } S_m = S_2 \\ -45° & \text{if } S_m = S_3 \\ -30° & \text{if } S_m = S_4 \end{array} \qquad (21)$$

In equation (20), if there are two or more equal minimum values, the device 333 selects only one according to the following priority in descending order:

$$\text{Priority} = \{S_0, S_2, S_4, S_1, S_3\} \qquad (22)$$

For example, if the minimum values are $S_2$ and $S_1$ simultaneously, then $S_m = S_2$ and $D_m = 30°$. The minimum detector outputs 326, 327, the absolute value $S_0$ at 325' corresponding to the direction of 90°, which outputs are generally designated at numeral 115 in FIG. 1, and the thresholding output C at 114, are sent together to the edge direction selector 116. A direction $D_S$ at 117 is selected according to the following rule:

$$D_S = \begin{array}{ll} 90° & \text{if } C = 1 \text{ or } S_0 - S_m < 8 \\ D_m & \text{otherwise} \end{array} \qquad (23)$$

In other words, in a high frequency region, C=1, or in the case where the edge is not strong enough, $S_0 - S_m < 8$, it is preferable to select the interpolation direction of 90°.

The edge direction signal $D_S$ at 117 is generally spiky with many inconsistently isolated directions or discontinuities along a main edge. Thus, it should be necessary to reinforce the detection result. Using the decision context, the two following types of binary filters 329 and 331 are efficient. The first type is directional filters 329 for consolidating the decision along a main edge. The second is horizontal filters 331 for mainly removing isolated decisions. These filters are logical filters functioning by the mechanism of majority vote.

Figure 4:
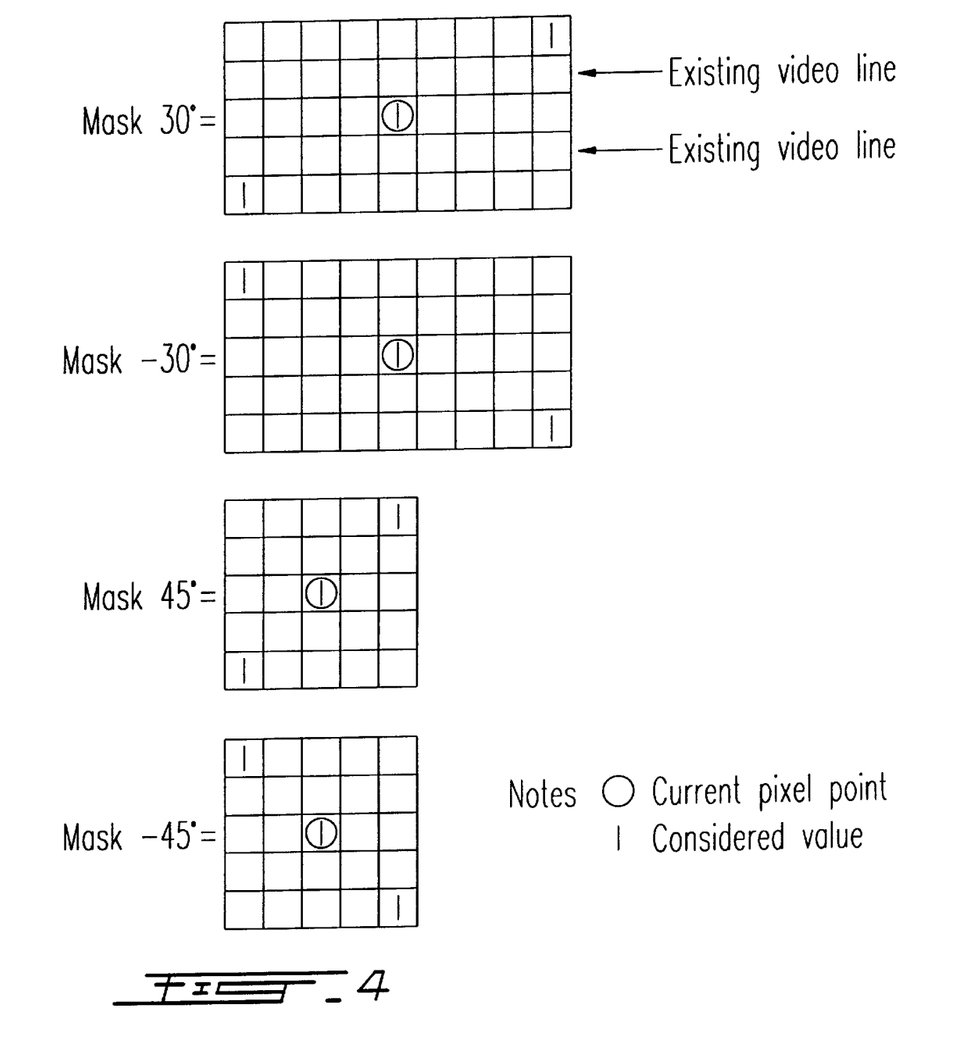
FIGS. 4–5 illustrate representations of the directional and horizontal masks used by the proposed binary filters for edge direction detection.

The directional binary filters 329 are composed of n−1 or four binary filters working in parallel. Each filter is associated only with one direction. The four directions considered are ±45° and ±30°. The fifth direction of 90° is not necessary to be considered since it is the complementary value of the results. The filter masks are given in FIG. 4 in which the circle represents the current pixel position and the "1" corresponds to the considered direction values.

In a given directional filter if two (2) of the three (3) considered pixels have the same filter direction then the current pixel of the filter output has also the same direction; otherwise the direction of the current pixel is set to be 90°.

In terms of hardware implementation, the fed direction signal $D_S$ at 117 a "1" for a corresponding directional filter and a "0" for the other filters. For each pixel considered, each filter utilizing its proper mask gives an output "1" for the current pixel if there are at least two "1" in the three considered pixel positions, otherwise a "0" output.

Figure 5:
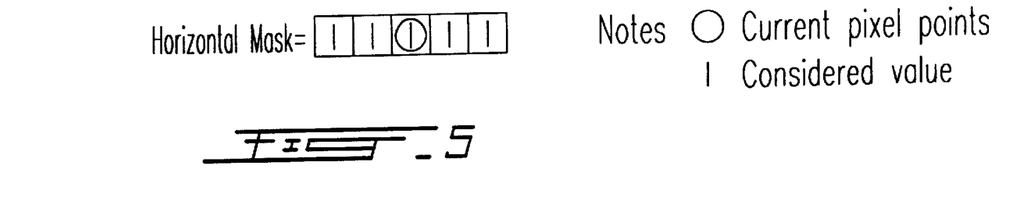

The four binary outputs 330 of the directional binary filters 329 are sent separately to four horizontal binary filters 331 individually associated with each directional filter. Each horizontal filter provides, in turn, a binary output "1" or "0" in accordance with the majority vote of five horizontal and consecutive pixels as illustrated in FIG. 5.

Since the binary filters work individually, there is some possibilities of conflicting results, i.e. two or more directions at a given pixel. A priority combiner 335 follows thus the binary filters. It firstly resolves the eventual conflicts by imposing the following priority in descending order:

$$\text{Priority} = (-45°, 45°, -30°, 30°) \qquad (24)$$

and secondly combines these binary signals to a final estimated spatial direction indicative signal $D_F$ at 107 of five possible values ±30, ±45 and 90°. The estimated direction value $D_F$ for each pixel is sent to the steered spatial and temporal interpolator 106 for an appropriate interpolation.

Returning to FIG. 1, the vertical motion detector 146 will be now described in more detail. In order to get a reliable result, the vertical motion detector 146 works on the lowpass filtered version of the luminance input signal. The filtering is done in the present field, i.e. signal 104, through the filter 111 in the previous field, i.e. signal 105, through the filter 122 and the next field, i.e. signal 101, through the filter 119. These filter outputs, respectively 112, 123 and 120 are sent together to a temporal direction difference calculator 121. The whole vertical motion detector is illustrated in some detail in FIG. 6.

The temporal directions differences calculator 121 finds the 4 following values, generally designated at 124 in FIG. 1:

$$T_0 = |Y_3(B_0) - Y_3(C_0)| \qquad (25)$$
$$T_1 = |Y_3(A_0) - Y_3(A'_0)|$$
$$T_2 = |Y_3(E'_0) - Y_3(D_0)| + 8$$
$$T_3 = |Y_3(E_0) - Y_3(D'_0)| + 8$$

wherein 8 is the utilized offset bias value introduced for the "up" and "down" motion indications $T_2$ and $T_3$, and $Y_3$ denotes the lowpass filtered version of luminance signal $Y_p$ at 104.

The four outputs values $T_i$ designated at 601, 602, 603 and 604 are applied together with the final estimated spatial direction indicative signal $D_f$ at 107 to a vertical motion decision device 125, which produces an output signal $D_t$ 126 in accordance with the following rule:

$$D_t = \text{``up''} \text{ if } T_2 \text{ is min and } D_7 = 90° \qquad (26)$$
$$\text{``down''} \text{ if } T_1 \text{ is min and } D_7 = 90°$$
$$\text{``else''}, \text{ otherwise.}$$

Since $D_t$ is given a value amongst three possibilities, it can be represented by two binary signals: "up/no up"; and "down/no down".

The vertical motion signal $D_t$ at 126 is still spiky. In order to get a reinforced final decision, it is necessary to utilize binary filters in a similar manner as the previously described edge direction detector. In this case, the binary filters 127 is composed of two sets of binary filters, one for "up" motion, one for "down" motion. Each set of filters is composed of three kinds of filters placed in series, namely 605, 606 and 607 respectively for 2D, horizontal and vertical binary filters. The vertical motion signal $D_t$ at the input of the two filter sets produces a "1" for the up filter and a "0" for the down filter when the decision is "up". Inversely it produces a "0" for the up filter and a "1" for the down filter when the decision is "down". The 2D binary filters 605 (one for up, one for down) are spatial 3×3 filters producing a "1" at their respective outputs by a majority vote. Precisely, a "1" will be produced at the filter output for the current pixel if, at least, five of the nine considered pixels in the filter are "1". Otherwise a "0" will be produced. The 2D filter outputs are applied to two separate horizontal filters 606 working independently. Each horizontal filter 606 utilizes a majority vote of five horizontal consecutive pixels in the filter. The horizontal filter outputs are applied in turn to two separate vertical filters 607 working independently by a majority vote from their respective 3 vertical consecutive pixels. These two last filters 607 send their result to a combiner 608 which combines these two results to produce a final vertical motion signal 132 representing a vertical motion (up or down) or no motion. This signal 132 will control the multiplexer 131 in the selection of two alternatives: vertical interpolation 129 for vertical motion or steered spatial interpolation 130 otherwise.

Figure 7:
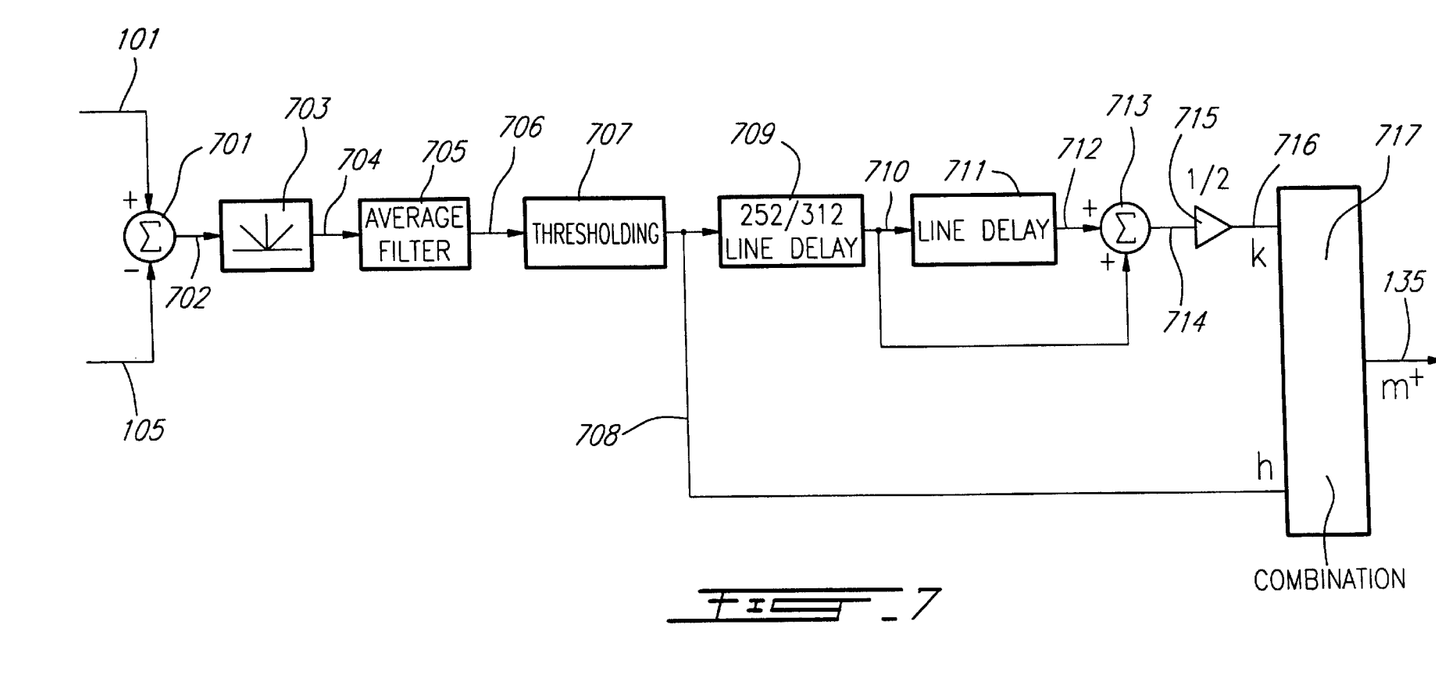
FIG. 7 is a block diagram of a proposed temporal motion detector for the embodiments shown in FIGS. 1 and 2.

Referring now to FIG. 7, there is illustrated a four field moving/still detector used as a temporal motion detector, wherein the detector inputs are the next and previous luminance signals 101 and 105. The field difference 702 obtained from a subtractor 701 is applied to a rectifier 703 which sends, in turn, the absolute value 704 of the frame difference to an average filter 705. The filter 705, which calculates the sum of three consecutive values, sends the result to a thresholding device 707. This device gives a binary "0" or "1" signal h at 708. The threshold is set to be 4 to produce the "1" output signal. The signal h is also delayed through delay 709 by 252 lines for the case of 60 Hz or by 312 lines for 50 Hz video. The line delay output 710 is sent to a one line delay 711 and the summing device 713 which combines the signal 710 and its one line delayed version 712 to form a signal 714 of three levels. The signal 714 is then divided by two to form the signal 6 k at 716. The two signals h and k, at 708 and 716 are combined together by the following equation in order to give the final temporal motion or moving/still detection signal m at 135:

$$m = h + k - h \cdot k \qquad (27)$$

It is interesting to note that the detection signal m is a result of 2 consecutive fields video information.

The detection signal m at 135 is used for the adaptation between the temporal or spatial interpolations as described previously by equation (9).

Figure 2:
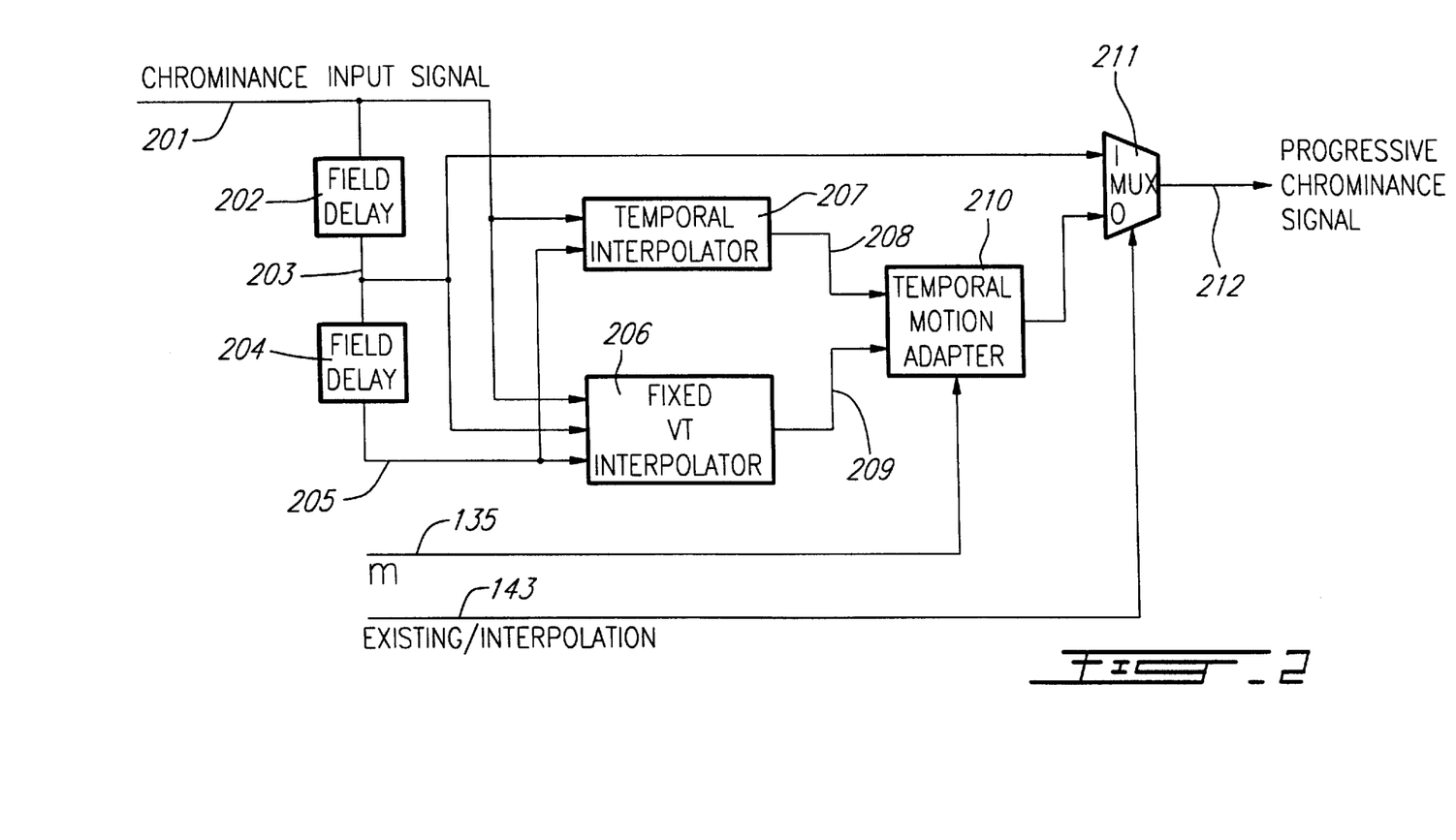
FIG. 2 is a general block diagram illustrating a second preferred embodiment of an apparatus and method according to the invention used for line interpolation of a chrominance signal.

Referring now to FIG. 2, a second embodiment of an apparatus and method according to the present invention used for line interpolation of a chrominance signal to produce a progressive chrominance signal. A first field delay 202 receives the chrominance input signal at 201 as next chrominance signal to generate a present chrominance signal 203, which in turn is fed to a second field delay 204 to produce a previous chrominance signal at 205. A vertical temporal interpolator 206, implementing a filter similar to equation (8), receives the next, present and previous chrominance signals to produce a vertically and temporally interpolated chrominance signal at 209. A temporal interpolator 207, implementing a filter similar to equation (1), receives the next and previous chrominance signals to produce a temporally interpolated signal at 208. Signals 208 and 209 are fed to a temporal motion adapter 210 the output 213 of which is controlled by the chrominance temporal motion indicative signal $m_c$ which is obtained by horizontally down sampling by two the signal m at 135 as produced by a temporal motion detector 134 as shown in FIG. 1, implementing equation (27). The present interpolated chrominance signal at 213 is then fed to a multiplexer 211 receiving the chrominance input signal, to produce the progressive chrominance signal at 212.

Figure 11:
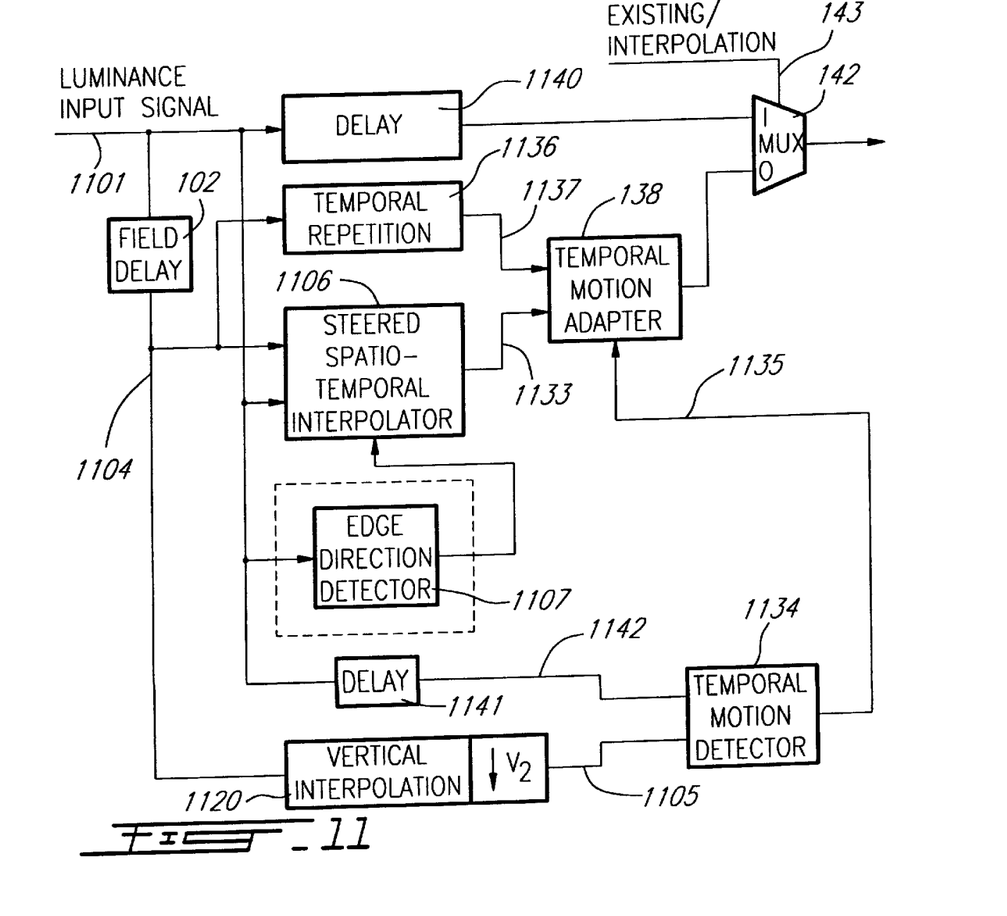
FIG. 11 is a general functional block diagram of a variant of the embodiment shown in FIG. 1, using one field memory.

Referring now to FIG. 11, a variant of the apparatus shown in FIG. 1 will be now explained, which variant apparatus implements one field memory. In the example shown, signal 1101 represents the considered signal in the present field, and signal 1104 represents previous or past field information. The temporal interpolator 1136 is a temporal field repetition device, having its output TF being equal to $C_0$ which is a previous field pixel value spatially corresponding to the pixel to be interpolated, as explained before with reference to FIG. 8. It can be seen that a same result is given by equation (1) given before, by substituting $C_0$ for $B_0$. Similar equations can be obtained for the steered spatio-temporal interpolator 1106 from equations (3) to (7) given before, by substituting therein $C_0$ for $B_0$, $E_{\pm i}$ for $D_{\pm i}$ and $E'_{\pm i}$ for $D'_i$. The interpolator 1106 is being controlled by the edge direction detector 1107 fed by the present field luminance signal 1101, which detector 1107 corresponds to the detector 145 shown in FIG. 1. The temporal motion or moving/still detector 1134 is of a same construction as that shown in FIG. 7, but with variant input signals 1142 and 1105, respectively being a delayed version of the present field signal 1101 and a one field delayed version of the present signal 1101. The one field delayed signal 1101 is produced from the previous field signal 1104 by a vertical interpolator 1120 followed by a vertical decimator 1121 applying a factor of 2 in order to create the one field (525/2 lines for 60 Hz or 625/2 lines for 50 Hz) delayed signal 1105. The delayed version of the present field signal 1101 is produced by the delay 1141 to compensate for delay introduced by the vertical interpolator 1120. It can be seen that the variant embodiment shown in FIG. 11 is not provided with a vertical motion detector such as detector 146 shown in FIG. 1, which omission can introduce some flicker in presence of vertically moving thin horizontal bars. However, since such bars are generally seldom seen in practice, induced flicker is generally not significant.

It is within the ambit of the present invention to cover any obvious modification or application of the apparatus and method disclosed in the present specification, provided they fall within the scope of the appended claims.

What is claimed is:

1. An apparatus for producing an output non-interlaced, progressive video component signal from an input interlaced video signal composed of a luminance signal and at least one chrominance signal by mixing lines of the interlaced video component signal with lines of a calculated signal, the apparatus comprising:
   interpolator means for producing an interpolated component signal using information from at least one field of said interlaced video component signal;
   temporal motion detector means for producing a temporal motion indicative signal using information from at least two fields of said interlaced video signal;
   temporal motion adapter means for generating said calculated signal using the first interpolated component signal and the temporal motion indicative signal;
   line multiplexer means for combining said interlaced video component signal with the calculated signal to produce said output progressive video component signal.

2. An apparatus as claimed in claim 1, wherein said progressive video component signal is a progressive video luminance signal, said information used by said motion detector being luminance information, said first interpolated component signal being a first interpolated luminance signal.

3. An apparatus as claimed in claim 2, further comprising an edge direction detector means for producing a spatial direction indicative signal associated with a selected one of a number of predetermined spatial directions, for each pixel of said calculated signal to be interpolated, said edge direction detector means using luminance information from at least one field of said interlaced video signal, said interpolator means comprising a spatio-temporal interpolator means being controlled by the spatial direction indicative signal.

4. An apparatus as claimed in claim 3, wherein there are five predetermined edge directions respectively forming angles of about $\pm 30°$, $\pm 45°$ and $+90°$ in a floating reference system having its origin being located at a pixel to be interpolated and having a first axis horizontally oriented.

5. An apparatus as claimed in claim 4, wherein said first interpolated luminance signal is defined by a selected one of the following equations:

$$SST-30° = (4A_{-2} + 4A'_2 + 2B_0 + 2C_0 - E_{-4} - E'_4 - D_{-4} - D'_4)/8$$

$$SST+30° = (4A_2 + 4A'_{-2} + 2B_0 + 2C_0 - E_4 - E'_{-4} - D_4 - D'_{-4})/8$$

$$SST-45° = (4A_{-1} + 4A'_1 + 2B_0 + 2C_0 - E_{-2} - E'_2 - D_{-2} - D'_2)/8$$

$$SST+45° = (4A_1 + 4A'_{-1} + 2B_0 + 2C_0 - E_2 - E'_{-2} - D_2 - D'_{-2})/8$$

$$SST+90° = (7A_0 + 7A'_0 + F_0 + F'_0 + 4B_0 + 4C_0 - 2E_0 - 2E'_0 - 2D_0 - 2D'_0)/16$$

wherein:
   SST is the first interpolated luminance signal associated with each of said directions;
   $A_{\pm i}$ is a value of a pixel$\pm$i, in said reference system having its origin being located at the pixel to be interpolated, of a present field existing previous line adjacent a present field line containing the pixel to be interpolated;
   $A'_{\pm i}$ is a value of a pixel$\pm$i, in the reference system, of a present field existing next line adjacent the present field line;
   $B_0$ is a next field pixel value spatially corresponding to the pixel to be interpolated;
   $C_0$ is a previous field pixel value spatially corresponding to the pixel to be interpolated;
   $D_{\pm i}$ is a value of a pixel$\pm$i, in the reference system having its origin being located at a next field pixel spatially corresponding to the pixel to be interpolated, of a next field existing previous line adjacent a next field line containing the next field pixel;
   $D'_{\pm i}$ is a value of a pixel$\pm$i, in the reference system having its origin being located at the next field pixel, of a next field existing next line adjacent the next field line;
   $E_{\pm i}$ is a value of a pixel$\pm$i, in the reference system having its origin being located at a previous field pixel spatially corresponding to the pixel to be interpolated, of a previous field existing previous line adjacent a previous field line containing the previous field pixel;
   $E'_{\pm i}$ is a value of a pixel$\pm$i, in the reference system having its origin being located at the previous field, of a previous field existing next line adjacent the previous field line;
   $F_0$ is a value of a present field existing pixel adjacent a pixel corresponding to $A_0$ in the direction $+90°$; and
   $F'_0$ is a value of a present field existing pixel adjacent a pixel corresponding to $A'_0$ in the direction $+90°$.

6. An apparatus as claimed in claim 4, wherein said first interpolated luminance signal is defined by a selected one of the following equations:

$$SST-30° = (4A_{-2} + 4A'_2 + 4C_0 - 2E_{-4} - 2E'_4)/8$$

$$SST+30° = (4A_2 + 4A'_{-2} + 4C_0 - 2E_4 - 2E'_{-4})/8$$

$$SST-45° = (4A_{-1} + 4A'_1 + 4C_0 - 2E_{-2} - 2E'_2)/8$$

$$SST+45° = (4A_1 + 4A'_{-1} + 4C_0 - 2E_2 - 2E'_{-2})/8$$

$$SST+90° = (7A_0 + 7A'_0 + F_0 + F'_0 + 4C_0 - 4E_0 - 4E'_0)/16$$

wherein:
   SST is the first interpolated luminance signal associated with each of said directions;
   $A_{\pm i}$ is a value of a pixel$\pm$i, in said reference system having its origin being located at the pixel to be interpolated, of a present field existing previous line adjacent a present field line containing the pixel to be interpolated;
   $A'_{\pm i}$ is a value of a pixel$\pm$i, in the reference system, of a present field existing next line adjacent the present field line;

$C_0$ is a previous field pixel value spatially corresponding to the pixel to be interpolated;

$E_{\pm i}$ is a value of a pixel±i, in the reference system having its origin being located at a previous field pixel spatially corresponding to the pixel to be interpolated, of a previous field existing previous line adjacent a previous field line containing the previous field pixel;

$E'_{\pm i}$ is a value of a pixel±i, in the reference system having its origin being located at the previous field, of a previous field existing next line adjacent the previous field line;

$F_0$ is a value of a present field existing pixel adjacent a pixel corresponding to $A_0$ in the direction $+90°$; and $F'_0$ is a value of a present field existing pixel adjacent a pixel corresponding to $A'_0$ in the direction $+90°$.

7. An apparatus as claimed in claim 3, wherein said edge direction detector means comprise:

highpass filter means for producing a first filtered luminance signal from said luminance information;

horizontal high frequency detector means for producing a high frequency indicative signal from the first filtered luminance signal;

lowpass filter means for producing a second filtered luminance signal from the luminance information;

edge direction calculator means for producing calculated edge direction signal from the second filtered luminance signal;

edge direction selector means for selecting a selected edge direction signal as said spatial direction indicative signal from the high frequency indicative signal and the calculated edge direction signal.

8. An apparatus as claimed in claim 7, wherein said highpass filter means comprise:

a first delay receiving said luminance information for producing a first delayed output signal fed to a positive input of a first adder;

a vertical lowpass filter receiving said luminance information for producing a vertically lowpass filtered signal fed in parallel to a negative input of the first adder and to a first positive input of a second adder having an second positive input being coupled to an output provided on the first adder;

a second delay connected to an output of the second adder for producing a second delayed output signal fed to a positive input of a third adder;

a horizontal lowpass filter receiving the vertically lowpass filtered signal and having an output connected to a negative input of the third adder having an output producing said first filtered luminance signal.

9. An apparatus as claimed in claim 7, wherein said horizontal high frequency detector means comprises a series combination of an absolute detector, a lowpass horizontal filter and a thresholding device set to a predetermined threshold, to produce said high frequency indicative signal.

10. An apparatus as claimed in claim 7, wherein said lowpass filter means comprise:

a vertical lowpass filter for producing a vertically lowpass filtered signal from said luminance information;

a horizontal lowpass filter for producing said second filtered luminance signal from the vertically lowpass filtered signal.

11. An apparatus as claimed in claim 7, wherein said edge direction calculator means comprises:

means for calculating directional absolute differences associated with said number of predetermined directions using said second filtered luminance signal;

means for detecting a minimum absolute difference associated with at least one of said predetermined directions, to produce said calculated edge direction signal.

12. An apparatus as claimed in claim 7, wherein said edge direction detector means further include edge direction binary filter means receiving said selected direction signal to produce said spatial direction indicative signal.

13. An apparatus as claimed in claim 12, wherein said edge direction binary filter means include a set of at least n−1 parallel separate directional binary filters producing at least n−1 filtered edge directions signals corresponding to at least n−1 predetermined edge directions, for filtering said selected direction signal to reduce edge discontinuities, wherein n is said number of predetermined directions.

14. An apparatus as claimed in claim 13, wherein said edge direction binary filter means further include a set of at least n−1 separate horizontal binary filters respectively receiving said at least n−1 filtered edge directions signals to remove isolated ones of said filtered edges direction signals.

15. An apparatus as claimed in claim 14, wherein said edge direction binary filter means further include a priority combiner means receiving said filtered edge directions signals to produce said spatial direction indicative signal.

16. An apparatus as claimed in claim 3, wherein said interpolator means further include a vertical interpolator means; and wherein said apparatus further comprises:

vertical motion detector means for producing a vertical motion indicative signal using luminance information from at least two fields of said interlaced video signal; and interpolated signal selector means controlled by the vertical motion indicative signal for selecting an output of said spatio-temporal interpolator means as said first interpolated luminance signal whenever a vertical motion is detected, and for selecting an output of said vertical interpolator means as said first interpolated luminance signal otherwise.

17. An apparatus as claimed in claim 16, wherein said vertical interpolator means output is defined by one of the following equations:

$$VF = (5A_0 + 5A'_0 - F_0 - F'_0)/8;\ \text{or}$$

$$VF = (36A_0 + 36A'_0 - 4F_0 - 4F'_0)/128;\ \text{or}$$

$$VF = (37A_0 + 37A'_0 - 5F_0 - 5F'_0)/128;$$

wherein:

VF is the vertical interpolator means output value;

$A_0$ and $A'_0$ are values of adjacent pixels of respectively preceding and following existing lines in the direction $+90°$ to a pixel to be interpolated;

$F_0$ and $F'_0$ are values of existing pixels adjacent said adjacent pixels in the direction $+90°$.

18. An apparatus as claimed in claim 16, wherein said vertical motion detector means include:

lowpass filter means for producing filtered luminance signals using luminance information from a previous field, a present field and a next field of said interlaced video signal;

temporal direction difference calculator means for producing temporal differences signals using the previous, present and next fields;

vertical motion decision means for producing a vertical motion signal value for the vertical motion indicative signal using the temporal directions differences signals and said edge direction indicative signal.

19. An apparatus as claimed in claim 18, wherein said vertical motion detector further includes binary filter means for filtering said vertical motion signal value to produce said vertical motion indicative signal.

20. An apparatus as claimed in claim 19, wherein said binary filter means includes a pair of two-dimensional filters both receiving said vertical motion signal value, said two-dimensional filters respectively producing an upward motion indicative signal whenever the vertical motion value corresponds to an upward motion and a downward motion indicative signal whenever the vertical motion signal value corresponds to a downward motion.

21. An apparatus as claimed in claim 20, wherein said binary filter means further include a pair of separate horizontal binary filters respectively receiving said upward and downward motion indicative signals for removing isolated ones of said upward and downward motion indicative signals.

22. An apparatus as claimed in claim 21, wherein said binary filter means further include a pair of separate vertical binary filters respectively receiving said upward and downward motion indicative signals for further removing isolated ones of said upward and downward motion indicative signals.

23. An apparatus as claimed in claim 22, wherein said edge direction binary filter means further include combiner means receiving said upward and downward motion indicative signal for selecting said vertical motion indicative signal as being downward motion indicative, upward motion indicative or non motion indicative.

24. An apparatus as claimed in claim 3, wherein said interpolator means further comprises a temporal interpolator means for producing a second interpolated luminance signal used by said temporal motion adapter means to generate said calculated signal.

25. An apparatus as claimed in claim 24, wherein said second interpolated luminance signal is defined by:

$$TF=(B_0+C_0)/2$$

wherein:

TF is the second interpolated luminance signal value;

$B_0$ is a next field pixel value spatially corresponding to the pixel to be interpolated; and $C_0$ is a previous field pixel value spatially corresponding to the pixel to be interpolated.

26. An apparatus as claimed in claim 24, wherein said second interpolated luminance signal is defined by:

$$TF=C_0/2$$

wherein:

TF is the second interpolated luminance signal value; and $C_0$ is a previous field pixel value spatially corresponding to the pixel to be interpolated.

27. An apparatus as claimed in claim 24, wherein the calculated signal is defined by:

$$NY=TF+m(SF-TF)$$

wherein:

NY is said calculated signal value;

SF is said first interpolated luminance signal value;

TF is said second interpolated luminance signal value; and m is said temporal motion indicative signal value, with $0 \leq m \leq 1$.

28. An apparatus as claimed in claim 27, wherein said temporal motion adapter means comprises:

a first adder having an input of a first polarity receiving said second interpolated luminance signal and having an input of a second opposed polarity receiving said first interpolated luminance signal for producing a difference interpolated signal;

a mixer having a first positive input receiving the difference interpolated signal and having a second input of said opposed polarity receiving said motion indicative signal for producing a combined signal;

a second adder having first and second positive inputs respectively receiving said second interpolated luminance signal and the combined signal for producing said temporal motion indicative signal.

29. An apparatus as claimed in claim 1, wherein said temporal motion detector means include:

a first adder having positive and negative inputs being respectively fed by luminance information from said at least two fields for producing a field difference signal;

a rectifier for producing an absolute field difference signal using the field difference signal;

an averaging filter for producing an average field difference signal using the absolute field difference signal;

a thresholding device being set to a predetermined threshold for producing a binary signal using the average field signal;

line delay means receiving the binary signal and having a delayed output signal being fed in parallel to a one line delay producing a combined delayed output fed to a first positive input of an adder and to a second positive input provided on said adder;

a combiner having a first input being coupled to an output of said adder and a second input receiving said binary signal, for producing said temporal motion indicative signal.

30. An apparatus as claimed in claim 1, wherein said progressive video component signal is a progressive video chrominance signal, said information used by said motion detector being luminance information, said first interpolated component signal being a first interpolated chrominance signal.

31. An apparatus as claimed in claim 30, wherein said interpolator means comprises a vertical temporal interpolator means.

32. An apparatus as claimed in claim 31, wherein said interpolator means further comprise a temporal interpolator means for producing a second interpolated chrominance signal used by said temporal motion adapter means to generate said calculated signal.

33. An apparatus as claimed in claim 32, wherein said second interpolated chrominance signal is defined by:

$$TF=(B_0+C_0)/2$$

wherein:

TF is the second interpolated chrominance signal value;

$B_0$ is a next field pixel value spatially corresponding to a pixel to be interpolated; and $C_0$ is a previous field pixel value spatially corresponding to the pixel to be interpolated.

34. An apparatus as claimed in claim 32, wherein the calculated signal is defined by:

$$NY = TF + m_c(SF - TF)$$

wherein:

NY is said calculated signal value;

SF is said first interpolated chrominance signal value;

TF is said second interpolated chrominance signal value; and $m_c$ is said chrominance temporal motion indicative signal value, with $0 \leq m_c \leq 1$.

35. An apparatus as claimed in claim 34, wherein said temporal motion adapter means comprises:

a first adder having an input of a first polarity receiving said second interpolated chrominance signal and having an input of a second opposed polarity receiving said first interpolated chrominance signal for producing a difference interpolated signal;

a mixer having a first positive input receiving the difference interpolated signal and having a second input of said opposed polarity receiving said motion indicative signal for producing a combined signal;

a second adder having first and second positive inputs respectively receiving said second interpolated chrominance signal and the combined signal for producing said temporal motion indicative signal.

36. An apparatus for producing an output non-interlaced, progressive video luminance signal by mixing lines of an input interlaced video luminance signal with lines of a calculated signal, the apparatus comprising:

edge direction detector means for producing a spatial direction indicative signal for each pixel of said calculated signal to be interpolated using luminance information from at least one field of said interlaced video signal;

interpolator means for producing an interpolated luminance signal using spatio-temporal information from at least two fields of said interlaced video luminance signal with said spatial direction indicative signal;

motion detector means for producing a temporal motion indicative signal using luminance information from at least two fields of said interlaced video luminance signal;

temporal motion adapter means for generating said calculated signal using said interpolated signal and said temporal motion indicative signal;

line multiplexer means for combining said interlaced video luminance signal with the calculated signal to produce said output progressive video luminance signal.

37. A method for producing an output non-interlaced, progressive video component signal from an input interlaced video signal composed of a luminance signal and at least one chrominance signal by mixing lines of the interlaced video component signal with lines of a calculated signal, the method comprising steps of:

a) producing an interpolated component signal using information from at least one field of said interlaced video component signal;

b) producing a temporal motion indicative signal using information from at least two fields of said interlaced video signal;

c) generating said calculated signal using the interpolated component signal and the temporal motion indicative signal; and d) combining said interlaced video component signal with the calculated signal to produce said output progressive video component signal.

38. A method as claimed in claim 37, wherein said progressive video component signal is a progressive video luminance signal, said information used by said motion detector being luminance information, said interpolated component signal being an interpolated luminance signal.

39. A method as claimed in claim 38, wherein said step a) comprises steps of:

i) producing a spatial direction indicative signal associated with a selected one of a number of predetermined spatial directions, for each pixel of said calculated signal to be interpolated, using luminance information from at least one field of said interlaced video signal;

ii) using the spatial direction indicative signal for producing said interpolated component signal using spatio-temporal information from said at least one field of said interlaced video component signal.

40. A method as claimed in claim 37, wherein said progressive video component signal is a progressive video chrominance signal, said information used by said motion detector being luminance information, said interpolated component signal being an interpolated chrominance signal.

* * * * *